United States Patent
Mantani (10) Patent No.: US 7,979,910 B2
(45) Date of Patent: Jul. 12, 2011

(54) DATA REPRODUCING APPARATUS AND TRANSMITTER AUTHENTICATING DATA REPRODUCING APPARATUS

(75) Inventor: Nobunori Mantani, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 798 days.

(21) Appl. No.: 12/043,004

(22) Filed: Mar. 5, 2008

(65) Prior Publication Data

US 2008/0222703 A1  Sep. 11, 2008

(30) Foreign Application Priority Data

Mar. 7, 2007 (JP) .................................. 2007-057643

(51) Int. Cl.
*H04L 9/32* (2006.01)
(52) U.S. Cl. ............... 726/26; 726/27; 726/29; 713/168
(58) Field of Classification Search .................. 713/168; 726/26

See application file for complete search history.

(56) References Cited

U.S. PATENT DOCUMENTS 7,120,251 B1 * 10/2006 Kawada et al. ............... 380/201
2006/0179305 A1 * 8/2006 Zhang ........................... 713/168

FOREIGN PATENT DOCUMENTS

JP  2005-51558   2/2005
JP  2006-163585  6/2006

OTHER PUBLICATIONS

Patent Abstracts of Japan for Japanese Publication No. 2005-051558, Publication date Feb. 24, 2005 (1 page).
Patent Abstracts of Japan for Japanese Application No. 2006-163585, Publication date Jun. 22, 2006 (1 page).

* cited by examiner

*Primary Examiner* — Ponnoreay Pich
(74) *Attorney, Agent, or Firm* — Osha Liang LLP (57) ABSTRACT

A data reproducing apparatus includes a receiver receiving the content and outputting the received content to an image display apparatus prepared in advance, and a transmitter transmitting the content to the receiver when authentication of the receiver is successful. Before transmitting the content, the transmitter transmits a request to start authentication to the receiver and executes an authentication process after a predetermined time. When the receiver cannot be authenticated, the transmission of the request to start authentication and the execution of the authentication process are repeated. Here, the predetermined time is variably set according to the number of times the request to start authentication is transmitted and the authentication is executed.

14 Claims, 7 Drawing Sheets

| COUNT | TIME |
|---|---|
| FIRST | 200msec |
| SECOND | 1000msec |
| THIRD | 2000msec |

DATA REPRODUCING APPARATUS AND TRANSMITTER AUTHENTICATING DATA REPRODUCING APPARATUS

BACKGROUND OF THE INVENTION

1. Field of the Invention

The present invention relates to a data reproducing apparatus and a transmitter, and particularly to a data reproducing apparatus and a transmitter for transmitting audio data and/or video data from a transmitting side to a receiving side and reproducing the received data by the receiving side.

2. Description of the Background Art

Various standards have been proposed as interfaces used to transfer digital AV (Audio and Visual) data by communication. In the case where content data is to be transferred, it is important to prevent copy. In order to prevent such copy, authentication is performed in some cases where content data is transferred.

Conventionally, products have been proposed that have capabilities complying with HDMI (High Definition Multimedia Interface) or DVI (Digital Visual Interface) that is an interface standard for the above-described authentication. Such products must have capabilities complying with HDCP (High-bandwidth Digital Content Protection) system used for encryption for copyright protection.

In the case where the authentication is performed using HDCP, the result of authentication may not be successful or OK depending on the timing of starting the authentication. Thus, in some cases, the transmitter cannot transfer data while the receiver cannot receive the data and accordingly video cannot be displayed. In order to overcome such a problem, the authentication is conventionally started at the timing adjusted appropriately for a receiver model for which it takes the longest time to succeed in authentication (the result of authentication is OK).

However, while many receiver models have the ability causing no problem even if the timing of starting authentication is advanced, it is a problem that the wasteful waiting time is generated before the video can be output.

A technique improving the above-described authentication capability is disclosed for example in Japanese Patent Laying-Open No. 2006-163585. According to the publication, failure of authentication is prevented in the following way. As a receiving apparatus starts a power-down mode, a predetermined command is given after the power down mode is thereafter cancelled, so as to allow a transmitting apparatus to resume transmission of an authentication code. Further, Japanese Patent Laying-Open No. 2005-051558 discloses a technique of facilitating extension of a cable while preventing deformation of the waveform of a transmission signal by reducing the load capacity of a DDC (Display Data Channel) of DVI.

None of the above-described publications, however, provides a configuration to adjust the timing of starting authentication appropriately for the ability of the receiver of the partner. Therefore, problems due to the fact that the same authentication start timing is uniformly employed for all receivers have not been solved.

SUMMARY OF THE INVENTION

An object of the present invention is to provide a data reproducing apparatus and a transmitter capable of variably setting the authentication start timing according to the capabilities of a receiver.

According to one aspect of the present invention, a data reproducing apparatus includes: a receiver receiving content data and outputting the content data to an output unit prepared in advance; and a transmitter transmitting the content data to the receiver when it is detected that authentication of the receiver is successful, and the data reproducing apparatus includes the following features.

The transmitter includes an authenticating unit transmitting, before the content data is transmitted, a request to start authentication to the receiver, and executing an authentication process after a predetermined time passes from the time when the request is transmitted. The transmitter repeats the transmission of the request to start authentication and the execution of the authentication process when it is detected, based on a result of the authentication process, that the authentication of the receiver is unsuccessful. The predetermined time is variably set according to the number of times the request to start authentication is transmitted and the authentication process is executed.

The authentication process is an authentication process complying with HDCP.

The transmitter includes a connection detecting unit detecting that the receiver is connected through a communication cable. The request to start authentication is transmitted after the connection detecting unit detects that the receiver is connected.

The transmitter further includes a parameter requesting unit transmitting to the receiver a request for a parameter indicating a characteristic of the output unit, after the connection detecting unit detects that the receiver is connected. The transmitter generates a dummy video signal based on the parameter received from the receiver in response to the request transmitted by the parameter requesting unit, and transmits the generated dummy video signal as the request to start authentication to the receiver.

The transmitter is mounted on a DVD (Digital Versatile Disc) apparatus reproducing the content data from a DVD and the receiver is mounted on a television receiver.

According to another aspect of the present invention, a data reproducing apparatus includes: a receiver receiving content data and outputting the content data to an output unit prepared in advance; and a transmitter transmitting the content data to the receiver when it is detected that authentication of the receiver is successful, and the data reproducing apparatus includes the following features. The transmitter includes an authenticating unit transmitting, before the content data is transmitted, a request to start authentication to the receiver, and executing an authentication process after a predetermined time passes from the time when the request is transmitted. The transmitter repeats the transmission of the request to start authentication and the execution of the authentication process when it is detected, based on a result of the authentication process, that the authentication of the receiver is unsuccessful. The predetermined time is variably set according to the number of times the request to start authentication is transmitted and the authentication process is executed.

Therefore, in the case where the authentication fails (is unsuccessful), the authentication start timing can be variably set according to the number of times the request to start authentication is transmitted and the authentication is executed. Thus, for any receiver for which the authentication can be started earlier, the authentication can be started earlier and accordingly the content data can be speedily transmitted.

Preferably, the authentication process is an authentication process complying with HDCP. Therefore, for the content data whose copyright is to be protected following the HDCP, the content data can be transmitted to only the receiver which is successfully authenticated.

Preferably, the transmitter includes a connection detecting unit detecting that the receiver is connected through a communication cable, and the request to start authentication is transmitted after the connection detecting unit detects that the receiver is connected.

Therefore, as the connection of the receiver is detected, the authentication process can be started automatically.

Preferably, the transmitter further includes a parameter requesting unit transmitting to the receiver a request for a parameter indicating a characteristic of the output unit, after the connection detecting unit detects that the receiver is connected. The transmitter generates a dummy video signal based on the parameter received from the receiver in response to the request transmitted by the parameter requesting unit, and transmits the generated dummy video signal as the request to start authentication to the receiver.

Therefore, the dummy video signal generated and transmitted by the transmitter is generated based on the parameter of the output unit to which the receiver is connected, namely the output unit which is controllable. Thus, the receiver can operate (process, analyze, for example) the received dummy video signal.

Preferably, the transmitter is mounted on a DVD apparatus reproducing the content data from a DVD and the receiver is mounted on a television receiver.

According to still another aspect of the present invention, a transmitter transmits content data to a receiver when it is detected that authentication of the receiver is successful, and the receiver receives the content data and outputs the content data to an output unit prepared in advance. The transmitter includes an authenticating unit transmitting, before the content data is transmitted, a request to start authentication to the receiver, and executing an authentication process after a predetermined time passes from the time when the request is transmitted. The transmitter repeats the transmission of the request to start authentication and the execution of the authentication process when it is detected, based on a result of the authentication process, that the authentication of the receiver is unsuccessful. The predetermined time is variably set according to the number of times the request to start authentication is transmitted and the authentication process is executed. The authentication process is an authentication process complying with HDCP.

The transmitter further includes a connection detecting unit detecting that the receiver is connected through a communication cable, and the request to start authentication is transmitted after the connection detecting unit detects that the receiver is connected. The transmitter further includes a parameter requesting unit transmitting to the receiver a request for a parameter indicating a characteristic of the output unit, after the connection detecting unit detects that the receiver is connected. The transmitter generates a dummy video signal based on the parameter received from the receiver in response to the request transmitted by the parameter requesting unit, and transmits the generated dummy video signal as the request to start authentication to the receiver. The transmitter is mounted on a DVD apparatus reproducing the content data from a DVD and the receiver is mounted on a television receiver.

According to a further aspect of the present invention, a transmitter transmits content data to a receiver when it is detected that authentication of the receiver is successful, and the receiver receives the content data and outputs the content data to an output unit prepared in advance. The transmitter includes an authenticating unit transmitting, before the content data is transmitted, a request to start authentication to the receiver, and executing an authentication process after a predetermined time passes from the time when the request is transmitted. The transmitter repeats the transmission of the request to start authentication and the execution of the authentication process when it is detected, based on a result of the authentication process, that the authentication of the receiver is unsuccessful. The predetermined time is variably set according to the number of times the request to start authentication is transmitted and the authentication process is executed.

Preferably, the authentication process is an authentication process complying with HDCP.

Preferably, the transmitter further includes a connection detecting unit detecting that the receiver is connected through a communication cable, and the request to start authentication is transmitted after the connection detecting unit detects that the receiver is connected.

Preferably, the transmitter further includes a parameter requesting unit transmitting to the receiver a request for a parameter indicating a characteristic of the output unit, after the connection detecting unit detects that the receiver is connected. The transmitter generates a dummy video signal based on the parameter received from the receiver in response to the request transmitted by the parameter requesting unit, and transmits the generated dummy video signal as the request to start authentication to the receiver.

Preferably, the transmitter is mounted on a DVD apparatus reproducing the content data from a DVD and the receiver is mounted on a television receiver.

According to the present invention, in the case where the authentication fails, the subsequent authentication start timing can be variably set according to the subsequent number of times the request to start authentication is started and the authentication is executed. Accordingly, for the receiver for which authentication can be started early, the authentication can be started early and the transmitter can speedily transmit the content data to the apparatus. Therefore, the user will not wait more than necessary before the content is output through the output unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described in detail with reference to the drawings.

Figure 1:
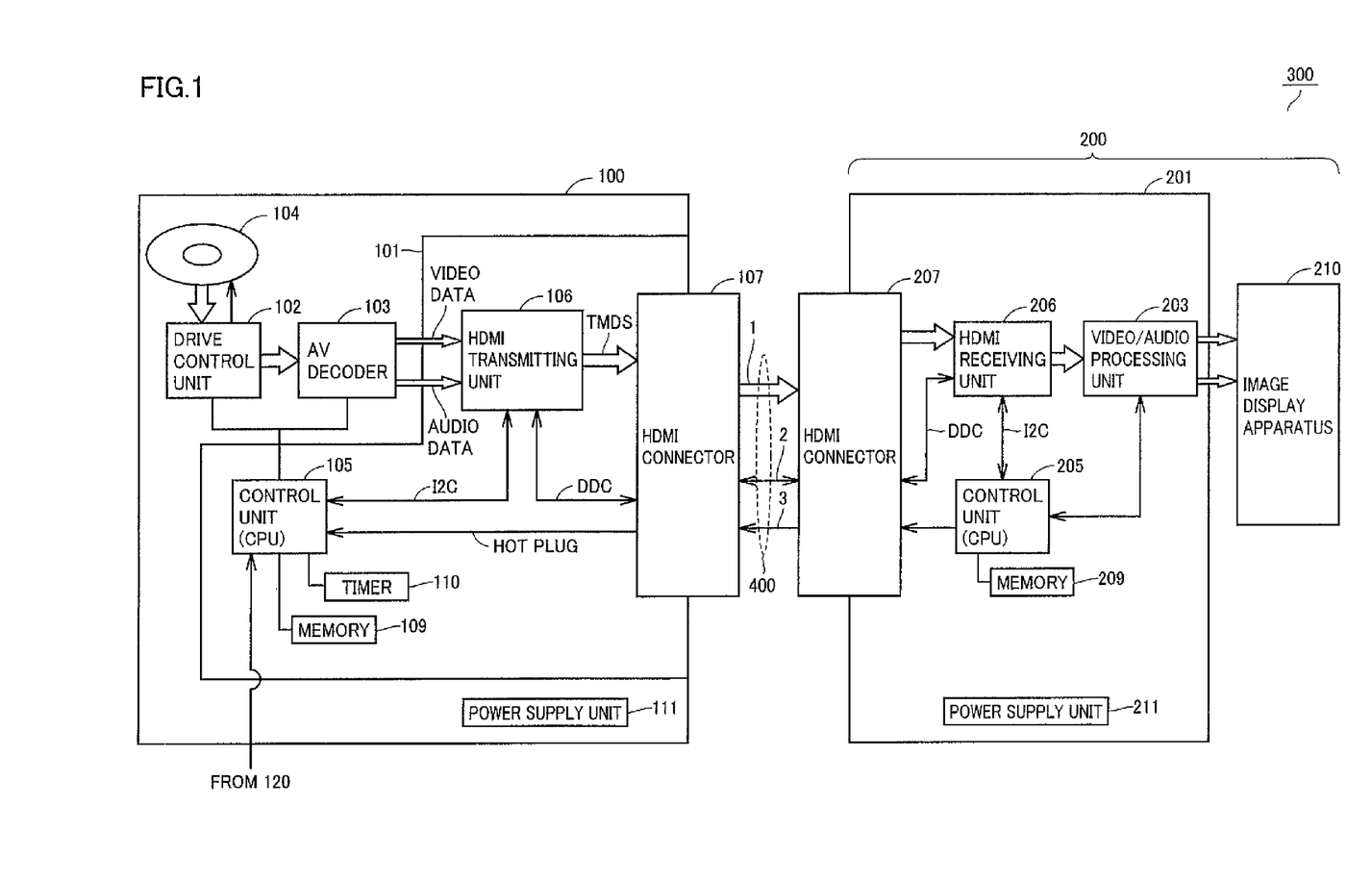
FIG. 1 is a configuration diagram of a reproducing apparatus according to an embodiment of the present invention.

FIG. 1 shows an exemplary configuration of a reproducing apparatus according to the present embodiment. Reproducing apparatus 300 includes a DVD Digital Versatile Disc) apparatus 100, a TV (television) receiver 200 and one cable 400 for connecting these by communication.

DVD apparatus 100 includes a DVD (Digital Versatile Disc) 104 detachably mounted on DVD apparatus 100, a drive control unit 102 for accessing data of DVD 104, an AV (Audio Visual) decoder 103 for decoding data which is read from DVD 104 through drive control unit 102, a transmitter 101 and a power supply unit 111 supplying electric power to each component of DVD apparatus 100.

Transmitter 101 includes an HDMI transmitting unit 106, an HDMI connector 107, a control unit 105 including a CPU (Central Processing Unit), a memory 109 and a timer 110.

TV receiver 200 includes a receiver 201 and an image display apparatus 210 to which LCD Liquid Crystal Display) or PDP (Plasma Display Panel) for example is applied. Receiver 201 includes an HDMI receiving unit 206, a video/audio processing unit 203, a control unit 205 including a CPU, a memory 209, an HDMI connector 207 and a power supply unit 211 supplying electric power to each component of receiver 201.

FIG. 1 shows that data of content read from DVD 104 is transmitted from transmitter 101 to receiver 201 and receiver 201 displays and outputs on image display apparatus 210 images and sounds based on the received data. Although the medium supplying the content is DVD 104 here, it may be a HD (Hard Disc). The medium is not limited to a particular one.

Transmitter 101 and receiver 201 are connected through cable 400 including a digital serial data line 1 complying with TMDS (Transmission Minimized Differential Signaling), a line 2 complying with DDC (Display Data Channel) and a hot plug line 3.

HDMI transmitting unit 106 and control unit 105 are connected by an I2C (Inter Integrated Circuit) bus. HDMI transmitting unit 206 and control unit 205 are also connected by an I2C bus. The I2C bus includes two signal lines of SCL (Serial Clock) and SDA (Serial Data Line).

Figure 2:
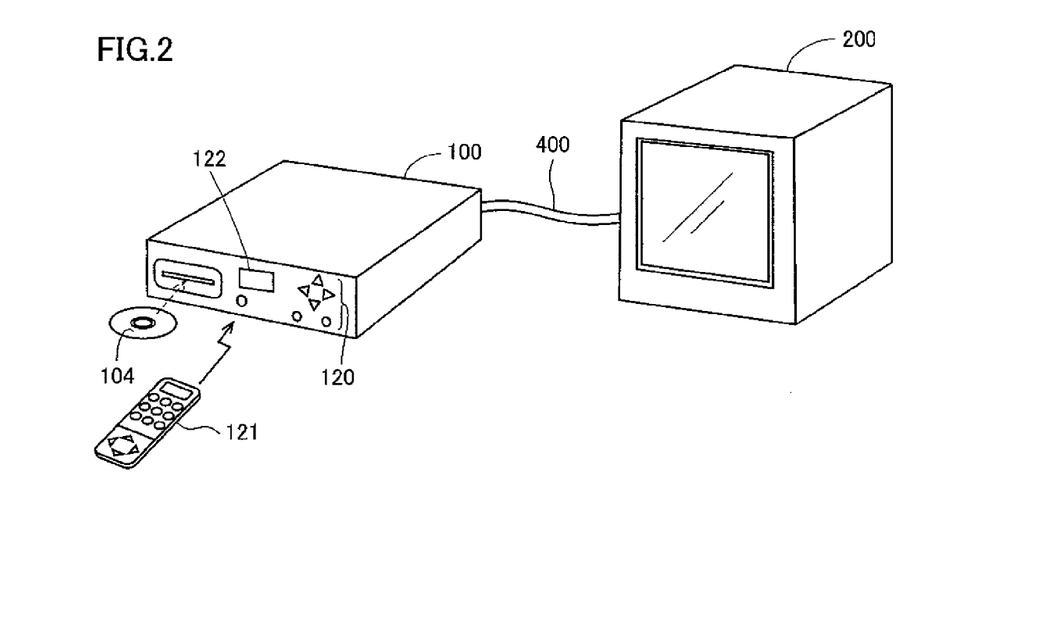
FIG. 2 is a diagram showing an external appearance of the reproducing apparatus according to the embodiment of the present invention.

Referring to FIG. 2, DVD apparatus 100 includes, at its front panel, a portion where DVD 104 is detachably mounted by a user, a key input unit 120, a display 122 for displaying an operation mode for example of DVD apparatus 100, and the capability of receiving a signal transmitted from a remote controller 121 as operated. Key input unit 120 and remote controller 121 are operated by a user for giving various types of commands to DVD apparatus 100.

When content data read from DVD 104 in DVD apparatus 100 is to be transmitted to TV receiver 200, authenticating operation using transmitter 101 and receiver 201 is performed between DVD apparatus 100 and TV receiver 200 before the data is transmitted. For this authenticating operation, memory 109 stores a table 10 in advance as shown in FIG. 3.

Figure 3:
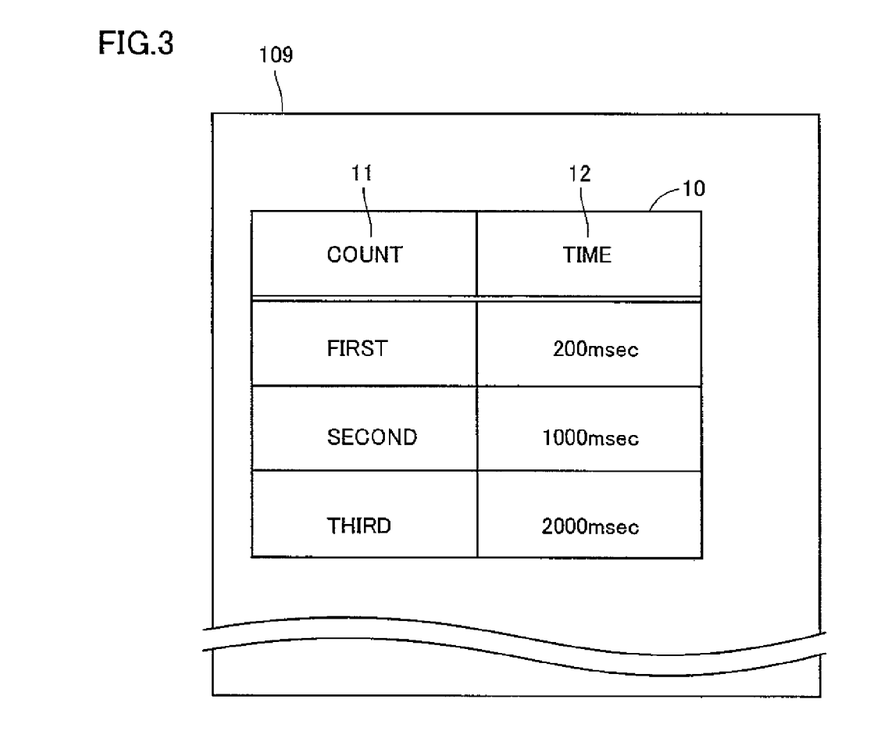
FIG. 3 is a diagram showing an example of the structure of a table according to the embodiment of the present invention.

Referring to FIG. 3, table 10 stores a plurality of data 11 indicating how many times the authenticating operation is performed between transmitter 101 and receiver 201 as well as data 12 indicating time for each of data 11. In table 10, for respective cases where the authentication is performed once, twice and three times as indicated by data 11, 200 msec, 1000 msec and 2000 msec that are time data 12 are stored. Time data 12 represents the waiting time before the authentication process is started between transmitter 101 and receiver 201. When the authentication process is performed and the authentication is successful, the content data is transmitted to receiver 201. Accordingly, content data is output to receiver 201. In consideration of the waiting time of the user before the content data is output, the maximum value of time data 12 is 2000 msec here. The value, however, is not limited to this value.

Figure 4:
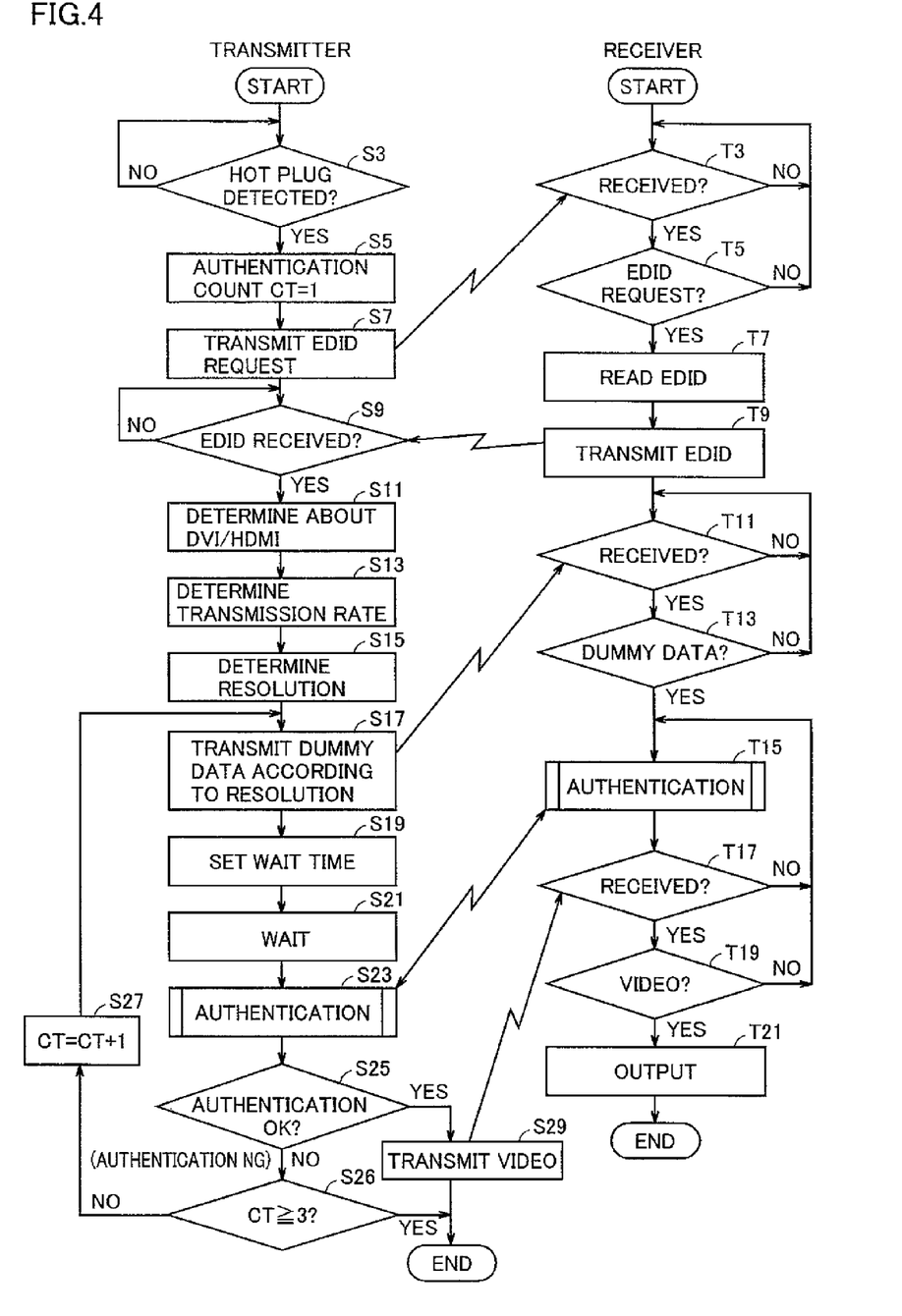
FIG. 4 is a flowchart of a process according to the embodiment of the present invention.
Figure 5:
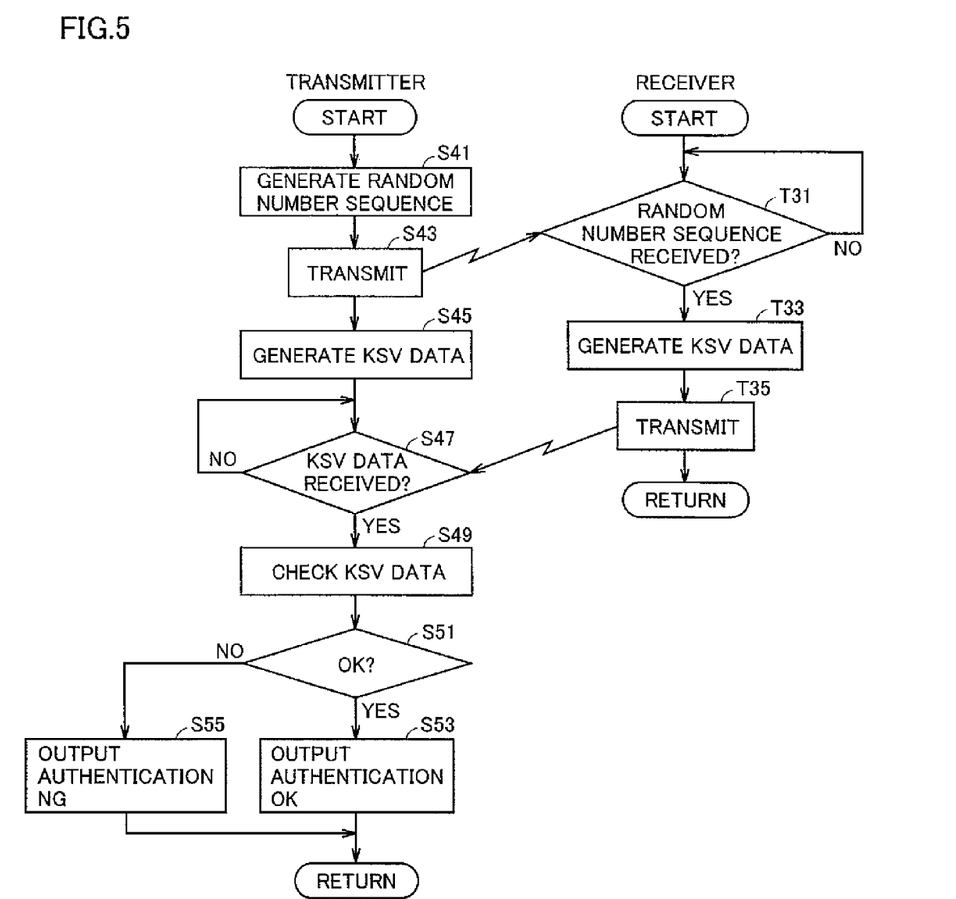
FIG. 5 is a flowchart of an authentication process according to the embodiment of the present invention.

FIGS. 4 and 5 each show a flowchart of a process according to the present embodiment.

Figure 6A:
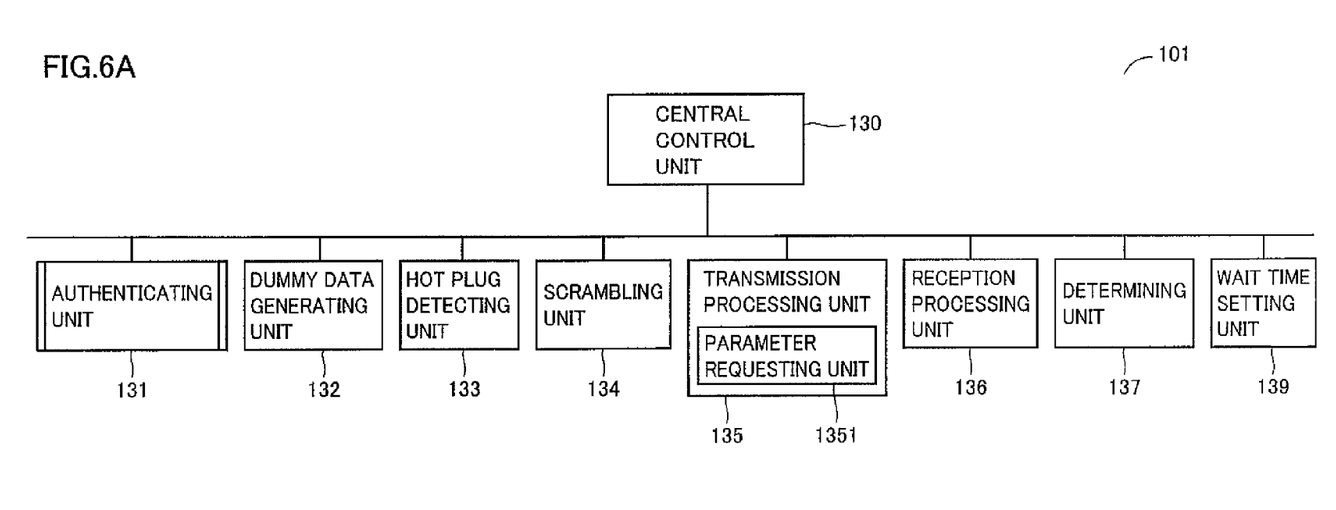
FIGS. 6A and 6B are each a functional configuration diagram of a transmitting apparatus according to the embodiment of the present invention.
Figure 6B:
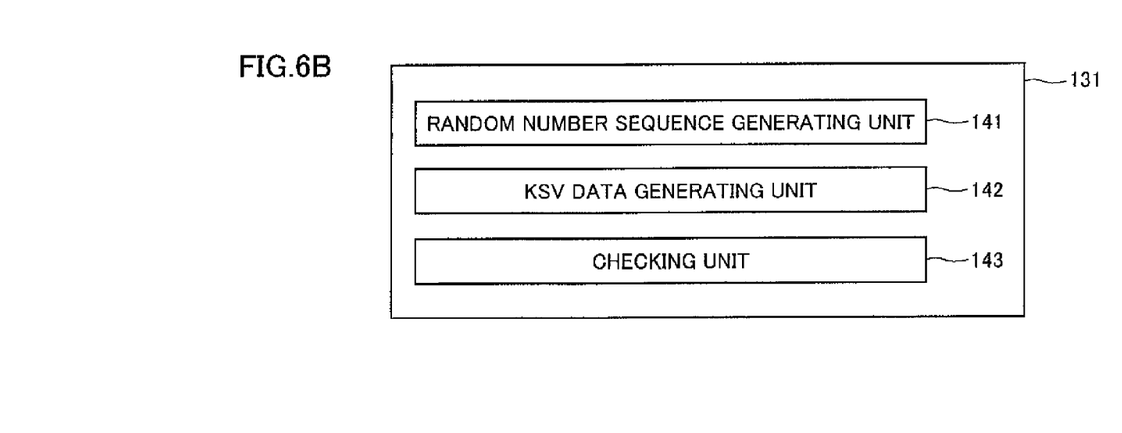

Referring to FIG. 6A, transmitter 101 includes a central control unit 130, an authenticating unit 131, a dummy data generating unit 132, a hot plug detecting unit 133, a scrambling unit 134, a transmission processing unit 135 having a parameter requesting unit 1351, a reception processing unit 136, a determining unit 137, and a wait time setting unit 139. Hot plug detecting unit 133 has the function of a connection detecting unit detecting that receiver 201 is connected through cable 400. Referring to FIG. 6B, authenticating unit 131 includes a random number sequence generating unit 141, a KSV (Key Selection Vector) data generating unit 142 and a checking unit 143.

Figure 7:
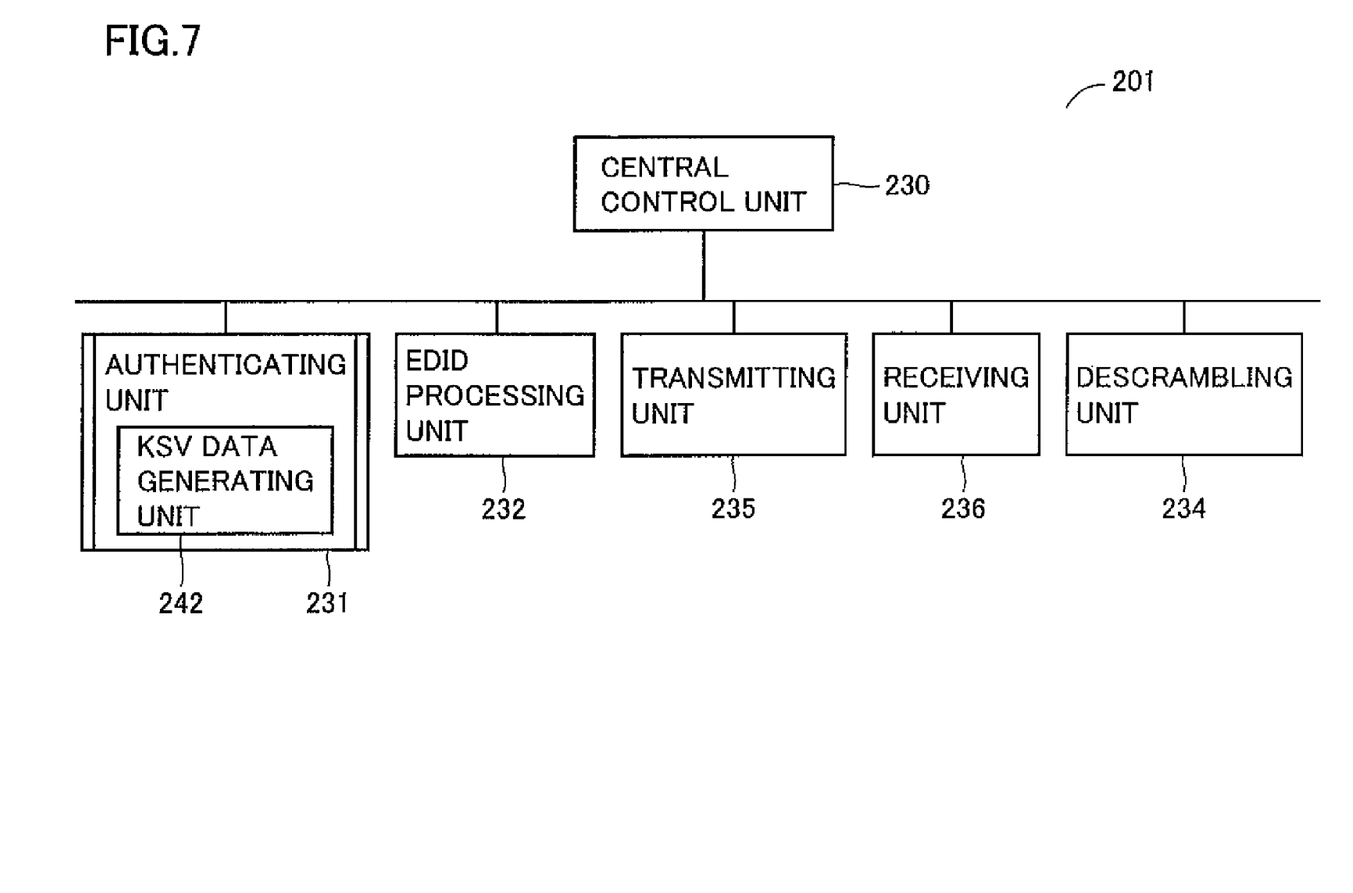
FIG. 7 is a functional configuration diagram of a receiving apparatus according to the embodiment of the present invention.

Referring to FIG. 7, receiver 201 includes a central control unit 230, an authenticating unit 231, an EDID (Extended Display Identification Data) processing unit 232, a transmitting unit 235, a receiving unit 236, and a descrambling unit 234. Authenticating unit 231 includes a KSV (Key Selection Vector) data generating unit 242.

A process of authentication at the time the transmission of digital content is started will be described following the flowcharts in FIGS. 4 and 5. For transmitting content data, transmitter 101 and receiver 201 communicate with each other. In the authentication process performed prior to the start of the communication of content data, however, authenticity of only one of the apparatuses (namely receiver 201) is determined.

It is supposed that an instruction is given to control unit 105 from the outside through key input unit 120 for example for reproducing and outputting predetermined digital content from DVD 104.

Hot plug detecting unit 133 of transmitter 101 always detects whether the transmitter is connected with receiver 201 through hot plug line 3, based on the signal level of HDMI connector 107 (step S3). Until it is detected that hot plug line 3 is connected (herein referred to as "hot plug is detected" or "hot plug detection"), the process step in S3 is repeated. When the hot plug is detected, the process of transmitter 101 is started. "Hot plug detection" here is specifically performed as follows.

A cable connection terminal (not shown) of HDMI connector 107 of transmitter 101 is always kept at a potential of 5 V by power supply unit 111. When one end of hot plug line 3 is connected to the cable connection terminal of transmitter 101 and the other end thereof is connected to a cable connection terminal (not shown) of HDMI connector 207 of receiver 201, a closed circuit including hot plug line 3 and respective cable connection terminals of transmitter 101 and receiver 201 is generated. Therefore, as a voltage signal of 5 V is output from transmitter 101, transmitter 101 can receive a voltage signal of 5 V from the partner (receiver apparatus 201). Therefore, detecting that the voltage signal of 5 V is input to the cable connection terminal of HDMI connector 107 from the partner (receiver apparatus 201), hot plug detecting unit 133 accordingly successfully detects the hot plug. As a result, transmitter 101 detects that receiver 201 is connected thereto.

Unless receiver 201 is connected to the other end of hot plug line 3, the closed circuit is not generated. Therefore, although transmitter 101 outputs the voltage signal of 5 V, the transmitter 101 cannot receive the voltage signal of 5 V in response thereto. Therefore, hot plug detecting unit 133 cannot detect that the voltage signal of 5 V is input to the cable connection terminal of HDMI connector 107. As a result, the hot plug cannot be detected and thus it is detected that receiver 201 is not connected to transmitter 101.

Detection of hot plug refers to the detection of the state where connection between transmitter 101 and receiver 201 is established by cable 400.

When the hot plug is detected (YES in step S3), central control unit 130 initializes the value of a temporary variable CT used for counting the number of times authentication is done to 1 (step S5). Variable CT represents a storage region of memory 109.

Then, transmission processing unit 135 uses parameter requesting unit 1351 to transmit an EDID request through cable 400 (step S7). The EDID request is a signal for requesting EDID data stored in advance in memory 209 of TV receiver 200. EDID data refers to parameters indicating the specifications and characteristics (resolution, aspect ratio, full HD (High Definition) or not for example) of image display apparatus 210.

In receiver 201 of TV receiver 200, central control unit 230 waits until receiving unit 236 receives the signal transmitted from transmitter 101 through HDMI connector 207 and cable 400 (step T3). When receiving unit 236 receives the signal transmitted from transmitter 101 (YES in step T3), central control unit 230 analyzes the signal received by receiving unit 236 and, based on the result of the analysis, determines whether or not the received signal represents the EDID request (step T5). When it is determined that the signal is any signal representing any other than the EDID request (NO in step T5), respective process steps in T3 and T5 are repeated until it is determined that the signal of EDID request is received.

In contrast, when it is determined based on the result of the analysis that the received signal represents the EDID request (YES in step T5), EDID processing unit 232 searches memory 209 to read EDID data (step T7). After this, the read EDID data is provided to transmitting unit 235. Thus, transmitting unit 235 transmits the provided EDID data through HDMI connector 207 and line 2 to transmitter 101, as a response to the EDID request (step T9).

In transmitter 101, central control unit 130 determines, after transmitting the EDID request, whether or not reception processing unit 136 receives the EDID data (step S9). Until it is determined that the EDID data is received, this step is repeated. When it is determined that the data is received (YES instep S9), the process proceeds to step S11.

In step S11, central control unit 130 determines, based on the received EDID data, whether to transmit the content following any of DVI and HDMI for communication with receiver 201 of TV receiver 200 and determines a transmission rate of the content data based on the result of the determination (step S13). Further, the resolution for the content data to be transmitted is determined (step S15).

In other words, central control unit 130 determines whether or not communication is performed following any of DVI and HDMI specifications based on the display specification data of image display 210 such as resolution and aspect ratio included in the EDID data received from receiver 201, and further determines the transmission rate for allowing the content data to be transmitted as the one that can be output by image display apparatus 210 of receiver 201.

After this, dummy data generating unit 132 generates dummy data of the video and provides the generated dummy data to transmission processing unit 135. Thus, transmission processing unit 135 transmits a signal of the received dummy data (video signal) through HDMI connector 207 to receiver 201 (step S17). The transmission of the video signal of the dummy data corresponds to transmission of a request to start the authentication process to receiver 201.

To transmitter 101, various models of receivers 201 may be connected. Receivers 201 have different capabilities depending on the models. Namely, to transmitter 101, it is possible that receiver 201 of the model which changes to the authentication process mode immediately after the video signal of the dummy data is received is connected while it is also possible that receiver 201 that cannot immediately change to the authentication process mode is connected.

Therefore, in the present embodiment, in consideration of the fact that the timing of starting the authentication process may vary depending on the model of receiver 201, receiver 201 variably sets the time from the transmission of the request to start the authentication process by transmitter 101 to the start of the authentication process, as described in the following.

Specifically, in receiver 201, receiving unit 236 receives the dummy data video signal (YES in steps T11 and T13). Central control unit 230 analyzes the received signal. When central control unit 230 determines, based on the result of the analysis, the dummy data video signal is received (detects that the request to start the authentication process is received), central control unit 230 subsequently causes authenticating unit 231 to perform the authentication process.

In transmitter 101 after transmitting the dummy data video signal, wait time setting unit 139 searches a table 10 of memory 109 based on the value of variable CT that indicates the present number of times the authentication is done. Based on the result of the search, data 12 of the time corresponding to data 11 representing the value of variable CT is read from table 10. The data 12 of the read time is provided to central control unit 130 (step S19). Central control unit 130 receives data 12 of the time as provided and waits for the time indicated by the received data 12 while counting time using timer 110 (step S21). In the wait time, the transmission and the reception are not performed at all by transmitter 101 and receiver 201.

When central control unit 130 detects that the wait time terminates based on the time counted by timer 110, central control unit 130 causes authenticating unit 131 to perform the authentication process (step S23).

The authentication process of receiver 201 (step T15) and the authentication process of transmitter 101 (step S23) are performed while receiver 201 and transmitter 101 transmit and receive data/signal. In this authentication process, transmitter 101 authenticates receiver 201, and receiver 201 does not authenticate transmitter 101. The authentication process will be described in detail hereinafter.

In transmitter 101, when central control unit 130 determines, based on the result of the authentication process in step S23, that the authentication of receiver 201 is successful (authentication OK), central control unit 130 controls drive control unit 102 to read predetermined content data which is designated in advance through operation of input unit 120, from the mounted DVD 104. The content data (video/audio data) read by drive control unit 102 is provided to AV decoder 103. AV decoder 103 receives the provided content data and decodes the data. As a result, from AV decoder 103, a digital signal representing the content data (the digital signal refers to "Video Data" and "Audio Data" in FIG. 1) is output. The digital signal is transmitted via HDMI transmitting unit 106 and HDMI connector 107 and through digital signal line 1 to receiver 201 (step S29).

In contrast, when central control unit 130 determines, based on the result of the authentication process (step S23), that the authentication is unsuccessful (authentication NG) (NO in step S25), central control unit 130 determines whether or not the value of variable CT is 3 or more (step S26). When it is determined that the value of variable CT is 3 or more (YES in step S26), the successive steps of the process come to an end. Therefore, if the number of times the authentication process is done is 3 or more as indicated by variable CT, the content data is not transmitted to receiver 201.

In contrast, when central control unit 130 determines that the value of variable CT is not 3 or more (NO in step S26), the value of variable CT is incremented by one (step S27). After this, the process returns to step S17 and the dummy data generated by dummy data generating unit 132 and transmission processing unit 135 is transmitted through digital signal line 1 to receiver 201. After this, in steps S19 and S21, wait time setting unit 139 searches table 10 based on the current value of variable CT. As a result of the search, new time data 12 is read. After standby for the period of the read time, the authentication process is performed again (step S23). Thus, if the authentication fails, the timing at which the following authentication process is started can be changed.

While the authentication of receiver 201 is unsuccessful, the time indicated by data 12 of the wait time read from table 10 is made longer as the number of times the authentication is unsuccessful, namely the number of times the authentication process is tried is larger. Accordingly, depending on the number of times the retry of authentication is done, the wait time from the current authentication to the subsequent authentication can be varied by transmitter 101.

As described above, while the authentication process is performed by transmitter 101, the authentication process is also performed by receiver 201 (step T15). After the authentication process, receiving unit 236 of receiver 201 waits for the reception of content data from transmitter 101 (step T17). The received data is analyzed and, when it is determined based on the result of the analysis that the received data is content data such as video (YES in step T19), the received content data is output to image display apparatus 210 through HDMI receiving unit 206 and video/audio processing unit 203. Accordingly, image display apparatus 210 displays and outputs video and audio corresponding to the content data transmitted from transmitter 101 (step T21).

The authentication process of transmitter 101 (step S23) and the authentication process of receiver 201 (step T15) will be described with reference to the flowchart in FIG. 5.

In authenticating unit 131 of transmitter 101, random number sequence generating unit 141 generates a random number sequence following a predetermined procedure (step S41). The data of the generated random number sequence is transmitted to receiver 201 through transmission processing unit 135, HDMI connector 107 and line 2 (step S43).

Then, KSV data generating unit 142 generates KSV data based on the data of the generated random number sequence (step S45). The generated KSV data is stored in memory 109. After this, the KSV data is read from memory 109 to be used in the authentication process. After the KSV data is generated, central control unit 130 waits until receiving from receiver 201 KSV data generated by receiver 201 (step S47).

In receiver 201, authenticating unit 231 receives the random number sequence data transmitted from transmitter 101 (YES in step T31).

Then, based on the received random number sequence data, KSV data generating unit 242 generates KSV data (step T33). The generated KSV data is transmitted by transmitting unit 235 to transmitter 101 (step T35). In receiver 201, the generated KSV data is stored in memory 209. After this, the data is read from memory 209 to be used in the authentication process.

In transmitter 101, reception processing unit 136 receives the KSV data from receiver 201 (YES in step S47). Checking unit 143 checks the KSV data generated in step S45 (namely the KSV data read from memory 109) against the KSV data of receiver 201 received in step S47 (step S49). When it is determined, based on the result of checking, that these KSV data match (YES in S51), "authentication OK" is output. When it is determined that these KSV data do not match, "authentication NG" is output (step S55).

Figure 8:
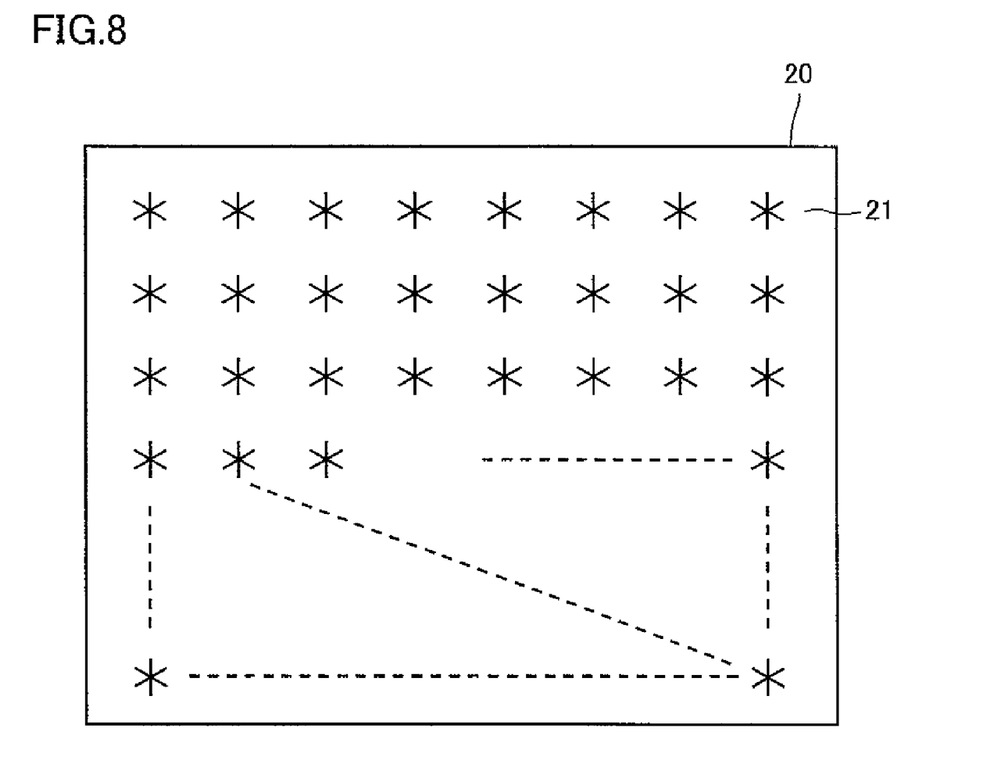
FIG. 8 is a diagram illustrating KSV (Key Selection Vector) data according to the embodiment of the present invention.

Here, examples of the KSV data generated respectively by KSV data generating units 142 and 242 will be described with reference to FIG. 8. KSV data 20 in FIG. 8 corresponds to a table where a plurality of keys 21 represented by "*" are registered. Checking unit 143 reads keys 21 recorded at respective predetermined addresses of the tables for these KSV data and compares respective values of read keys 21 with each other. When it is determined, based on the result of the comparison, that these values match each other, it is accordingly determined that these KSV data match each other (YES in S55). If the values do not match each other, it is determined that the KSV data do not match each other (NO in step S51).

In the case where the result of authentication is "authentication NG," there are the possibilities that receiver 201 has not prepared sufficient KSV data, software of receiver 201 has bugs generated therein, and the transmission path of cable 400 has noise, for example.

When the content data is transmitted from transmitter 101 to receiver 201, scrambling unit 134 scrambles the content data to be transmitted, based on KSV data 20 read from memory 109 of transmitter 101, and thereafter the scrambled content data is transmitted. Descrambling unit 234 of receiver 201 descrambles the received content data based on the KSV data read from memory 209 of receiver 201. The descrambled content data is output via video/audio processing unit 203 to image display apparatus 210. Here, "to scramble content data" refers to the operation of generating a noise signal based on KSV data 20 and overlay the generated noise signal on the signal of the content data to be transmitted (video data or both of the video data and the audio data). After thus scrambled, the content data (content data on which noise is overlaid) is transmitted.

"To descramble" refers to remove the noise signal from the signal of the content data with a filter for example.

Here, while the content data is transmitted after the authentication of receiver 201 is found successful, the checking process by the checking unit 143 may be performed. For example, each time data of 127 frames of video data in the content data is transmitted, or at every two seconds, checking unit 143 determines whether or not respective values of keys 21 subsequent to keys 21 used for the previous checking process of respective KSV data 20 match each other. If the values match each other, the transmission of the content data is continued. If the values do not match, the transmission is stopped (or forced to be terminated). It is supposed here that data indicating the address on the table of KSV data 20 for designating the subsequent key 21 is stored in advance in memory 109. Checking unit 143 reads the data of the address from memory 109 and, based on the read address data, searches these KSV data 20 to find respective subsequent keys 21. Therefore, even in the case where "authentication OK" is detected accidentally in step S51, the authentication is performed by regularly checking KSV data 20 while the content data is transmitted subsequently. Accordingly, copyright protection such as prevention of illegal copy of content data is more effective.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A data reproducing apparatus comprising:
a receiver receiving content data and outputting the content data to an output unit prepared in advance; and
a transmitter transmitting said content data to said receiver when it is detected that authentication of said receiver is successful,
said transmitter including an authenticating unit transmitting, before said content data is transmitted, a request to start authentication to said receiver, and executing an authentication process after a predetermined time passes from the time when the request is transmitted,
said transmitter repeating the transmission of said request to start authentication and the execution of said authentication process when it is detected, based on a result of the authentication process, that the authentication of said receiver is unsuccessful,
said predetermined time being variably set according to the number of times said request to start authentication is transmitted and said authentication process is executed,
said authentication process being an authentication process complying with HDCP (High-bandwidth Digital Content Protection),
said transmitter including a connection detecting unit detecting that said receiver is connected through a communication cable, and said request to start authentication being transmitted after said connection detecting unit detects that said receiver is connected,
said transmitter further including a parameter requesting unit transmitting to said receiver a request for a parameter indicating a characteristic of said output unit, after said connection detecting unit detects that said receiver is connected,
said transmitter generating a dummy video signal based on said parameter received from said receiver in response to said request transmitted by said parameter requesting unit, and transmitting said generated dummy video signal as said request to start authentication to said receiver, and
said transmitter being mounted on a DVD (Digital Versatile Disc) apparatus reproducing said content data from a DVD and said receiver being mounted on a television receiver.

2. A data reproducing apparatus comprising:
a receiver receiving content data and outputting the content data to an output unit prepared in advance; and
a transmitter transmitting said content data to said receiver when it is detected that authentication of said receiver is successful,
said transmitter including an authenticating unit transmitting, before said content data is transmitted, a request to start authentication to said receiver, and executing an authentication process after a predetermined time passes from the time when the request is transmitted,
said transmitter repeating the transmission of said request to start authentication and the execution of said authentication process when it is detected, based on a result of the authentication process, that the authentication of said receiver is unsuccessful, and
said predetermined time being variably set according to the number of times said request to start authentication is transmitted and said authentication process is executed.

3. The data reproducing apparatus according to claim 2, wherein
said authentication process is an authentication process complying with HDCP (High-bandwidth Digital Content Protection).

4. The data reproducing apparatus according to claim 3, wherein
said transmitter further includes a connection detecting unit detecting that said receiver is connected through a communication cable, and
said request to start authentication is transmitted after said connection detecting unit detects that said receiver is connected.

5. The data reproducing apparatus according to claim 4, wherein
said transmitter further includes a parameter requesting unit transmitting to said receiver a request for a parameter indicating a characteristic of said output unit, after said connection detecting unit detects that said receiver is connected, and
said transmitter generates a dummy video signal based on said parameter received from said receiver in response to said request transmitted by said parameter requesting unit, and transmits said generated dummy video signal as said request to start authentication to said receiver.

6. The data reproducing apparatus according to claim 2, wherein
said transmitter further includes a connection detecting unit detecting that said receiver is connected through a communication cable, and
said request to start authentication is transmitted after said connection detecting unit detects that said receiver is connected.

7. The data reproducing apparatus according to claim 6, wherein
said transmitter further includes a parameter requesting unit transmitting to said receiver a request for a parameter indicating a characteristic of said output unit, after said connection detecting unit detects that said receiver is connected, and
said transmitter generates a dummy video signal based on said parameter received from said receiver in response to said request transmitted by said parameter requesting unit, and transmits said generated dummy video signal as said request to start authentication to said receiver.

8. A transmitter transmitting content data to a receiver when it is detected that authentication of said receiver is successful, said receiver receiving the content data and outputting the content data to an output unit prepared in advance,
said transmitter comprising an authenticating unit transmitting, before said content data is transmitted, a request to start authentication to said receiver, and executing an authentication process after a predetermined time passes from the time when the request is transmitted,
said transmitter repeating the transmission of said request to start authentication and the execution of said authentication process when it is detected, based on a result of the authentication process, that the authentication of said receiver is unsuccessful, said predetermined time being variably set according to the number of times said request to start authentication is transmitted and said authentication process is executed, said authentication process being an authentication process complying with HDCP (High-bandwidth Digital Content Protection), said transmitter further comprising a connection detecting unit detecting that said receiver is connected through a communication cable, and said request to start authentication being transmitted after said connection detecting unit detects that said receiver is connected, said transmitter further comprising a parameter requesting unit transmitting to said receiver a request for a parameter indicating a characteristic of said output unit, after said connection detecting unit detects that said receiver is connected, said transmitter generating a dummy video signal based on said parameter received from said receiver in response to said request transmitted by said parameter requesting unit, and transmitting said generated dummy video signal as said request to start authentication to said receiver, and said transmitter being mounted on a DVD (Digital Versatile Disc) apparatus reproducing said content data from a DVD and said receiver being mounted on a television receiver.

9. A transmitter transmitting content data to a receiver when it is detected that authentication of said receiver is successful, said receiver receiving the content data and outputting the content data to an output unit prepared in advance, said transmitter comprising an authenticating unit transmitting, before said content data is transmitted, a request to start authentication to said receiver, and executing an authentication process after a predetermined time passes from the time when the request is transmitted, said transmitter repeating the transmission of said request to start authentication and the execution of said authentication process when it is detected, based on a result of the authentication process, that the authentication of said receiver is unsuccessful, and said predetermined time being variably set according to the number of times said request to start authentication is transmitted and said authentication process is executed.

10. The transmitter according to claim 9, wherein said authentication process is an authentication process complying with HDCP (High-bandwidth Digital Content Protection).

11. The transmitter according to claim 10, wherein said transmitter further comprises a connection detecting unit detecting that said receiver is connected through a communication cable, and said request to start authentication is transmitted after said connection detecting unit detects that said receiver is connected.

12. The transmitter according to claim 11, wherein said transmitter further comprises a parameter requesting unit transmitting to said receiver a request for a parameter indicating a characteristic of said output unit, after said connection detecting unit detects that said receiver is connected, and said transmitter generates a dummy video signal based on said parameter received from said receiver in response to said request transmitted by said parameter requesting unit, and transmits said generated dummy video signal as said request to start authentication to said receiver.

13. The transmitter according to claim 9, wherein said transmitter further comprises a connection detecting unit detecting that said receiver is connected through a communication cable, and said request to start authentication is transmitted after said connection detecting unit detects that said receiver is connected.

14. The transmitter according to claim 13, wherein said transmitter further comprises a parameter requesting unit transmitting to said receiver a request for a parameter indicating a characteristic of said output unit, after said connection detecting unit detects that said receiver is connected, and said transmitter generates a dummy video signal based on said parameter received from said receiver in response to said request transmitted by said parameter requesting unit, and transmits said generated dummy video signal as said request to start authentication to said receiver.

* * * * *